US011276430B2

(12) United States Patent
Cosemans (10) Patent No.: US 11,276,430 B2
(45) Date of Patent: Mar. 15, 2022

(54) STORAGE DEVICE USING A TAPE FOR STORING DATA

(71) Applicant: IMEC vzw, Leuven (BE)

(72) Inventor: Stefan Cosemans, Leuven (BE)

(73) Assignee: IMEC vzw, Leuven (BE)

(*) Notice: Subject to any disclaimer, the term of this patent is extended or adjusted under 35 U.S.C. 154(b) by 0 days.

(21) Appl. No.: 17/116,895

(22) Filed: Dec. 9, 2020

(65) Prior Publication Data
US 2021/0174832 A1    Jun. 10, 2021

(30) Foreign Application Priority Data
Dec. 10, 2019  (EP) .................................... 19214763

(51) Int. Cl.
*G11B 15/26* (2006.01)
*G11B 5/008* (2006.01)
*G11B 15/60* (2006.01)

(52) U.S. Cl.
CPC .......... *G11B 15/26* (2013.01); *G11B 5/00813* (2013.01); *G11B 15/605* (2013.01)

(58) Field of Classification Search
None
See application file for complete search history.

(56) References Cited

U.S. PATENT DOCUMENTS

| | | | |
|---|---|---|---|
| 5,969,912 A | 10/1999 | Cope | |
| 6,037,070 A * | 3/2000 | Meguro | G11B 5/7021 210/500.22 |
| 7,082,006 B1 * | 7/2006 | Smith | G11B 5/5504 250/559.29 |
| 7,085,095 B2 * | 8/2006 | Saliba | G11B 5/584 360/71 |
| 8,059,502 B2 * | 11/2011 | Mahnad | G11B 7/1353 369/44.28 |

(Continued)

FOREIGN PATENT DOCUMENTS

| | | |
|---|---|---|
| CA | 700213 A | 12/1964 |
| GB | 2447360 A | 9/2008 |

(Continued)

OTHER PUBLICATIONS

Charlot et al., "Bistable nanowire for micromechanical memory", Journal of Micromechanics and Microengineering, Feb. 2008, in 7 pages.

(Continued)

*Primary Examiner* — K. Wong
(74) *Attorney, Agent, or Firm* — Knobbe, Martens, Olson & Bear, LLP (57) ABSTRACT

A storage device including a tape configured to store data is disclosed. The tape includes a plurality of first regions with a first dielectric constant and a plurality of second regions with a second dielectric constant that is higher than the first dielectric constant. The first regions and the second regions are arranged in an alternating manner along the length of the tape. Further, the storage device includes one or more actuators configured to apply an electrical field across the width of the tape, in order to move the tape in length direction. Further, the storage device includes one or more data heads configured to read and/or write data from and/or to the tape.

20 Claims, 5 Drawing Sheets

(56) References Cited

U.S. PATENT DOCUMENTS

| | | |
|---|---|---|
| 8,120,876 B2 * | 2/2012 | Deckers ............. G11B 20/1201 360/134 |
| 9,123,421 B2 | 9/2015 | Annunziata |
| 2009/0002867 A1 | 1/2009 | Gage et al. |
| 2009/0129139 A1 | 5/2009 | Kam et al. |
| 2017/0117014 A1 | 4/2017 | Cideciyan et al. |
| 2019/0173007 A1 | 6/2019 | Liu et al. |
| 2020/0118589 A1 * | 4/2020 | Terakawa ............... G11B 5/706 |

FOREIGN PATENT DOCUMENTS

| | | |
|---|---|---|
| JP | 2003-224985 A | 8/2003 |
| WO | WO 2011/128700 A2 | 10/2011 |
| WO | WO 2018/125065 A1 | 7/2018 |

OTHER PUBLICATIONS

Choi et al., "Compact Nano-Electro-Mechanical Non-Volatile Memory (NEMory) for 3D Integration", IEEE International Electron Devices Meeting, Washington, D.C., 2007, pp. 603-606.

Furrer et al., "201 GB/in$^2$ Recording Areal Density on Sputtered Magnetic Tape", IEEE Transactions on Magnetics, Feb. 2018, vol. 54, No. 2, in 8 pages.

Krylov et al., "Bistability of curved microbeams actuated by fringing electrostatic fields", Nonlinear Dyn, 2011, vol. 66, pp. 403-426.

NASA's Jet Propulsion Laboratory, "Nanoactuators Based on Electrostatic Forces on Dielectrics", Apr. 1, 2005 in 4 pages.

Extended European Search Report in corresponding European Patent Application No. 19214763.5 dated Jun. 3, 2020.

\* cited by examiner

FIG. 5

STORAGE DEVICE USING A TAPE FOR STORING DATA

CROSS-REFERENCE TO RELATED APPLICATIONS

This application claims foreign priority to European Application No. 19214763.5, filed Dec. 10, 2019, the contents of which are incorporated by reference herein in its entirety.

BACKGROUND

Technological Field

The disclosed technology relates to storage devices. Particularly, the disclosed technology relates to storage devices configured to store data on a tape or sheet. Embodiments of the disclosed technology present such a storage device, wherein the storage device includes a special kind of actuator mechanism for transporting the tape along its length. The actuator mechanism of the storage device is based on a linear dielectric slab actuator mechanism.

Description of the Related Technology

The storage market is today dominated by NAND flash, Hard Disk Drive (HDD) and conventional tape memory.

NAND flash is relatively fast (about 100 µs of latency), has a good form factor such that it fits in handheld devices, but is rather expensive per stored bit. The NAND flash cost reduction roadmap seems to be nearing an end.

HDDs are of lower cost per stored bit than NAND flash, but are much slower (about 6 ms of random search time), and are also very poor at reading many small files. Further, HDDs are relatively large devices, and thus are not suited for handheld devices. Even for laptops and data center space, this is a major disadvantage.

Conventional tape memory is much cheaper than HDDs, but is also much slower than HDDs, and can only be used for archival purposes. Furthermore, conventional tape memory devices are rather large.

Thus, there is a need for storage devices with reduced cost per stored bit (comparable to or better than HDDs), a good form factor (comparable to NAND flash), and better speed than HDDs (especially for reading many small files).

Micromechanical storage devices have been proposed as a solution, but because the size of the storage medium was only as large as the micromechanical chip, they never had a commercial advantage. Other concepts, such as magnetic racetrack memory, are still not fully developed.

SUMMARY OF CERTAIN INVENTIVE ASPECTS

In view of the above-mentioned disadvantages, embodiments of the disclosed technology propose an improved storage device. An objective is, in particular, a storage device with a low cost per stored bit, a small form factor, and a reasonable speed, both in terms of read/write latency and read/write throughput (especially for reading many small files). Other objectives, features and advantages of the disclosed technology will appear from the present disclosure.

The embodiments of the disclosed technology are based on a new kind of tape (memory) for storing data, wherein the tape is based on a flexible nanosheet. Such a tape provides, for example, a significant area enhancement, as well as an increased ratio of the storage medium area to the overall storage device area. Thus, such a tape allows building a storage device with a small form factor. Further, the increased ratio reduces the cost per bit, which can thus be low in the storage device according to embodiments of the disclosed technology.

In order to also achieve a good read/write speed with such a tape, a precise and fast actuating mechanism for the tape in the storage device may be required. The embodiments of the disclosed technology, to this end, present a storage device that employs a dielectric slab actuator mechanism to move the tape.

A first aspect of the disclosed technology provides a storage device including: a tape configured to store data, wherein the tape includes a plurality of first regions with a lower dielectric constant and a plurality of second regions with a higher dielectric constant, the first regions and the second regions arranged along the length of the tape in an alternating manner; one or more actuators configured to apply an electrical field across the width of the tape, in order to move the tape in length direction; and one or more data heads configured to read and/or write data from and/or to the tape.

The tape may be a flexible nanosheet for storing data, for example, a parallel flexible nanosheet storage. A surface area of the tape may be configured to store the data. According to one aspect of the storage device, an area enhancement is provided by the tape, and the storage device can be built compactly and with a low cost per bit. Due to the different regions of the tape with their different dielectric constants, a fast and precise actuation of the tape by one or more actuators is enabled. Thus, fast write and/or read to and/or from the tape is possible. Overall, an improved storage device is provided.

In an implementation of the storage device, each of the first regions has a lower dielectric constant in a range of 1-10, and/or each of the second regions has a higher dielectric constant in a range of 50-100.

This allows a particular fast and precise control of the transportation of the tape along its length. Thus, reads and/or writes of data from/to the tape can be carried out at a particularly high speed.

In an implementation of the storage device, each of the second regions has a length in a range of 0.1-10 µm.

In an implementation of the storage device, the second regions are periodically arranged along the length of the tape with a pitch in a range of 0.2-20 µm.

The length range and the pitch range, respectively, contribute to a fast and reliable movement of the tape along its length.

In an implementation of the storage device, the tape includes a bulk material with a lower dielectric constant, the bulk material forming the first regions, and the bulk material includes a plurality of material elements with a higher dielectric constant, the material elements being arranged one after the other along the length of the tape and forming the second regions.

This provides a simple but efficient implementation of a tape with the first and second regions, respectively.

In an implementation of the storage device, the bulk material includes polyethylene naphthalate (PEN), and/or each of the material elements includes $TiO_2$, $BaTiO_3$ (BTO), barium zirconate titanate (BZT), or ZrO.

In an implementation of the storage device, each of the material elements has a width in a range of 60%-80% of the width of the tape, and/or the material elements occupy together between 20%-45% of the total volume of the tape.

In this disclosure, the width of the tape refers to the thickness or height of the tape. Along the length of the tape, each of the material elements forming the second regions may have a length of 40%-60% (for instance, 50%), compared to a first region. Along the breadth of the tape (perpendicular to length and width/thickness), each material element may have the same breadth as the tape, or between 90%-100% of the breadth of the tape.

In an implementation of the storage device, one or more surface regions of the tape are configured to store the data.

For instance, two opposite surfaces of the tape, for example, with respect to the tape width/height/thickness, may be configured to store data, separately. In this way, the bulk of the tape can be used for creating the first and second regions, respectively, in order to reliably transport the tape through the storage device.

In an implementation of the storage device, each actuator includes at least three electrodes, the tape being sandwiched between a first electrode arranged on one side of the tape, and a second electrode and a third electrode arranged on the other side of the tape.

In an implementation of the storage device, each actuator is configured to apply a fixed voltage to the first electrode and an alternating voltage across the second and third electrode, in order to move the tape in length direction.

The above implementations of the actuator enable a fast movement of the tape in the storage device.

In an implementation of the storage device, a distance between the first electrode and the second electrode and/or the third electrode is in a range of 110%-200% of the width of the tape.

In an implementation, the storage device further includes one or more cavities, each configured to receive a part of the tape.

The cavities can be used to store tape, for example, parts of the tape that are currently not needed. In this way, the tape can be long, while the storage device can still have a compact form factor.

In an implementation, the storage device further includes a plurality of actuators arranged along the length of the tape, and a plurality of cavities, each cavity being aligned with a gap between two adjacently arranged actuators.

In an implementation of the storage device, each cavity is arranged, in the length direction, before or after the one or more actuators.

In an implementation, the storage device is further configured to fold the tape in each cavity.

Thus, an even longer tape is enabled, and the storing of the tape in the storage device efficiently uses the available space.

In an implementation, the storage device is configured to: determine a position of the tape relative to the one or more data heads and the one or more actuators based on one or more read signals obtained from the one or more data heads and/or based on capacitive sensing of one or more of the second regions, and determine, based on the position of the tape, a voltage pattern to apply to the one or more actuators.

The storage device may include processing circuitry and/or one or more processors, and may include a memory. For instance, these elements may constitute a control unit, which is configured to determine the position based on the one or more read signals and/or the capacitive sensing. The control unit may further instruct a power unit to apply the voltage pattern to the one or more actuators. These actuators may then accordingly apply an electric field across the width/thickness/height of the tape.

BRIEF DESCRIPTION OF THE DRAWINGS

The above described aspects and implementations are explained in the following description of embodiments with respect to the enclosed drawings.

DETAILED DESCRIPTION OF CERTAIN ILLUSTRATIVE EMBODIMENTS

Figure 1:
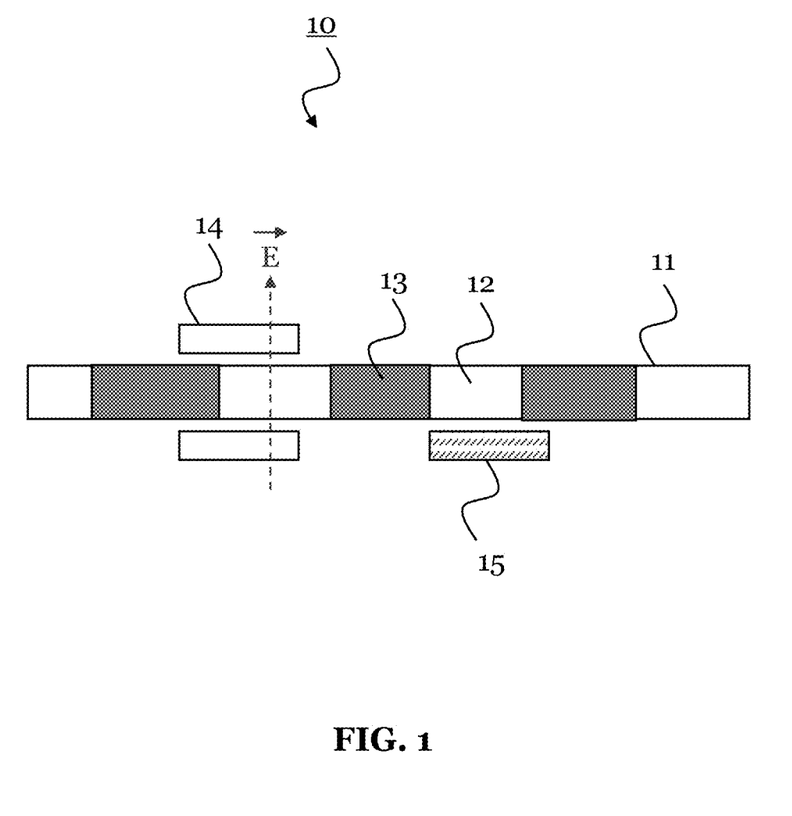
FIG. 1 shows a storage device according to an embodiment of the disclosed technology.

FIG. 1 shows a storage device 10 according to an embodiment of the disclosed technology. The storage device 10 may be a storage chip using a tape 11 to store data, and may in particular employ a flexible nanosheet storage medium as the tape 11. The tape 11 is, in particular, configured to store data at different positions along its length. For instance, a surface region of the tape 11 may be configured to store the data. An area enhancement is achieved by using the tape 11 in the storage device 10, that is, there is more storage area relative to the overall size of the storage device 10.

The storage mechanism of storing data into the tape 11 can be magnetic (as in HDD), charge (as in flash), ferroelectric polarization, phase change memory (as in blue-ray), denting in polymers (as in millipede), RRAM resistive state, or chemical reactions (for example, DNA-like molecules). The tape 11 can be prepared in a variety of ways, for example, using techniques from large-area electronics or roll-to-roll web processing.

The storage device 10 includes the tape 11, which specifically includes a plurality of first regions 12 with a lower dielectric constant, and a plurality of second regions 13 with a higher dielectric constant. For example, each of the first regions 12 may have a dielectric constant in a range of 1-10, particularly 1-5, and more particularly 1-3. Each of the second regions 13 may have a dielectric constant in a range of 50-100, particularly 60-90, and more particularly 70-80. Accordingly, the first regions 12 and the second regions 13 may be made of different materials.

The first regions 12 and the second regions 13 are alternatingly arranged along the length of the tape 11. The first regions 12 and the second regions 13 may have the same length and/or the same width, but in one implementation, they have different lengths and/or different widths. The second regions 13 may be enclosed by the first regions 12, or vice versa. The material of the second regions 13 may be embedded into the material of the first regions 12, or vice versa.

The tape 11 further includes one or more actuators 14, wherein each actuator 14 is configured to apply an electrical field across the width (thickness/height) of the tape 11, for example, across the tape 11. The width/thickness/height of the tape 11 is the extension of the tape 11 along a first direction or axis (vertical in FIG. 1, as noted by the dotted arrow E), the length of the tape 11 is the extension of the tape 11 along a second direction or axis (horizontal in FIG. 1), and the breadth of the tape 11 is the extension of the tape 11 along a third direction or axis (into the plane in FIG. 1). Thus, the one or more actuators are configured to move the tape 11, in the storage device 10, in the length direction of the tape 11, that is, along the length of the tape 11. Each of the one or more actuators 14 may be controlled individually by the storage device 10, in order to apply an individual electric field across the width of the tape 11. Multiple actuators 14 may also be controlled together, for example a set of actuators 14 of all actuators 14 of the storage device 10 may be controlled together. The fact that different actuators 14 can operate independently, greatly improves the performance of the storage device 10, in particular, when accessing multiple small files. Further, it reduces the energy consumption of the storage device 10.

Notably, moving the tape 11 in its length direction does not necessarily include moving the entire tape 11 in the length direction (although this is possible), but may include moving only one or more segments of the tape 11 along the length direction (for example, if the tape 11 or one or more segments of the tape 11 are folded, and the movement includes an unfolding of the tape 11 or of the one or more tape segments).

Further, the storage device 10 includes one or more data heads 15, which are configured to read and/or write data from and/or to the tape 11. That is, each data head 15 is configured to read and/or write data from and/or to the tape 11. In particular, multiple data heads 15 may read and/or write data from and/or to the tape 11 in parallel, for example, from and/or to different positions or regions on the surface region of the tape 11. It is possible to align one or more read and/or write data heads 15 to one or more specific segments, for example cell tracks, on the storage tape 11.

The storage device 10 may contain many "tape drives," wherein each tape drive may include one or more actuators 14 for moving the tape 11 (or for moving a segment of the tape 11) back and forth (along the length direction). Further, each tape drive may include one or more read and/or write data heads 15. Multiple actuators 14 and/or multiple data heads 15 of the storage device 10, for example, in a certain tape drive, may be arranged periodically along the breadth of the tape 11, for example, with a 1 µm pitch. Alternatively or additionally, it is also possible that multiple actuators 14 and/or multiple data heads 15 of the storage device 10 are staggered or arranged along the length of the tape 11.

The storage device 10 may contain an array of such tape drives. For example, a storage device 10 (for example, measuring about 10 mm×10 mm) may include more than 100 rows of tape drives. Each tape drive may be 100 µm wide. The read/write data heads 15 may be arranged with a 1 µm pitch, and, for example, more than 100 data heads 15 per tape drive may be provided. Further, the storage device 10 may include more than 1000 columns of tape drives, wherein the tape drives may be provided with a pitch of 10 µm.

The length of the tape 11 can be very long, for example, as long as 10 mm or more. This can lead to a larger area enhancement ratio, wherein the area enhancement ratio is defined as: {area of the storage medium (tape 11)}/{area of the storage device 10} with a factor {tape (segment) length}/tape drive pitch, thus providing a cheap storage. However, two limiting factors for the tape length may be access time and space available to store the tape 11. Longer tapes 11 may result in slower access times. Further, longer tapes 11 may require more space for storing and/or folding the tape 11. For instance, it is possible to use one or more cavities to store the tape 11. For this, the tape 11 can be folded, and thus, it should be able to fold nicely and should be thin, for example, significantly less than 5 µm thick.

Assuming, for instance, a tape length of 10 mm, a storage device area of 10 mm×10 mm, an area enhancement ratio of 1000 and a bit density on the storage medium tape of 25 nm×25 nm, a 160 Tbit/storage device 10 can be achieved, that is, having more than 160× the density of a NAND flash.

Figure 2:
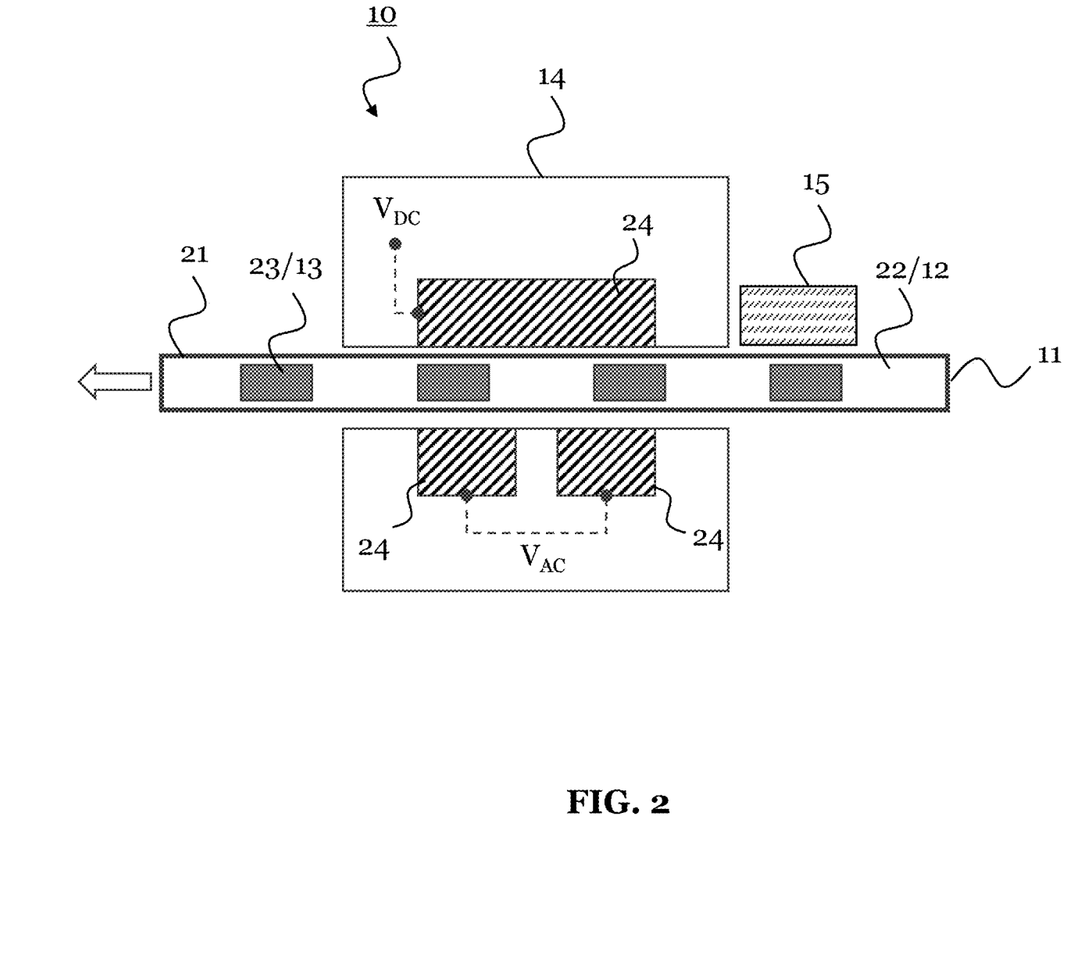
FIG. 2 shows more details of the storage device according to an embodiment of the disclosed technology.

FIG. 2 shows a storage device 10 according to an embodiment of the disclosed technology, which builds on the embodiment of FIG. 1. The device 10 of FIG. 2 has further, optional features. Same elements in FIG. 1 and FIG. 2 are labelled with the same reference signs and function likewise.

In particular, the storage device 10 of FIG. 2 uses linear dielectric slab actuation to move the tape 11. In FIG. 2, the tape 11 specifically includes a bulk material 22 (for example, polyethylene naphthalate (PEN)) with a lower dielectric constant, and the bulk material 22 forms the first regions 12. Further, the bulk material 22 includes a plurality of material elements 23 (for example, $TiO_2$ elements) with a higher dielectric constant. The material elements 23 may be arranged one after the other along the length of the tape 11, and form the second regions 13.

The material elements 23 may each have a width in a range of 60%-80% of the width/thickness of the tape 11 (for example, perpendicular to the length of the tape 11). Generally, the tape 11 may be wider/thicker than the second regions 13. Each material element 23 may have the same width/thickness in a direction across the tape 11. Each material element 23 may have the same length in direction of the length of the tape 11. Further, the material elements 23 may occupy, together, between 20%-45%, in particular 20%-30%, of the total volume of the tape 11. Each material element 23 may thereby have the same volume.

It is also shown in FIG. 2 that each actuator 14 may include at least three electrodes 24. Thereby, the tape 11 is located between a first electrode 24 arranged on one side of the tape 11, and a second and third electrode 24 arranged on the other (opposite) side of the tape 11. The storage device 10, in particular each actuator 14, may be configured to apply a fixed voltage to the first electrode 24, and may be configured to apply, at the same time as the fixed voltage, an alternating voltage to the second and third electrode 24, that is, across the second and third electrode 24. This operation scheme, together with the regions of different dielectric constant of the tape 11, causes the tape 11 to move in the length direction. Based on the applied voltages (amplitude and frequency), a speed of movement of the tape 11 can be set and/or adjusted.

Figure 3:
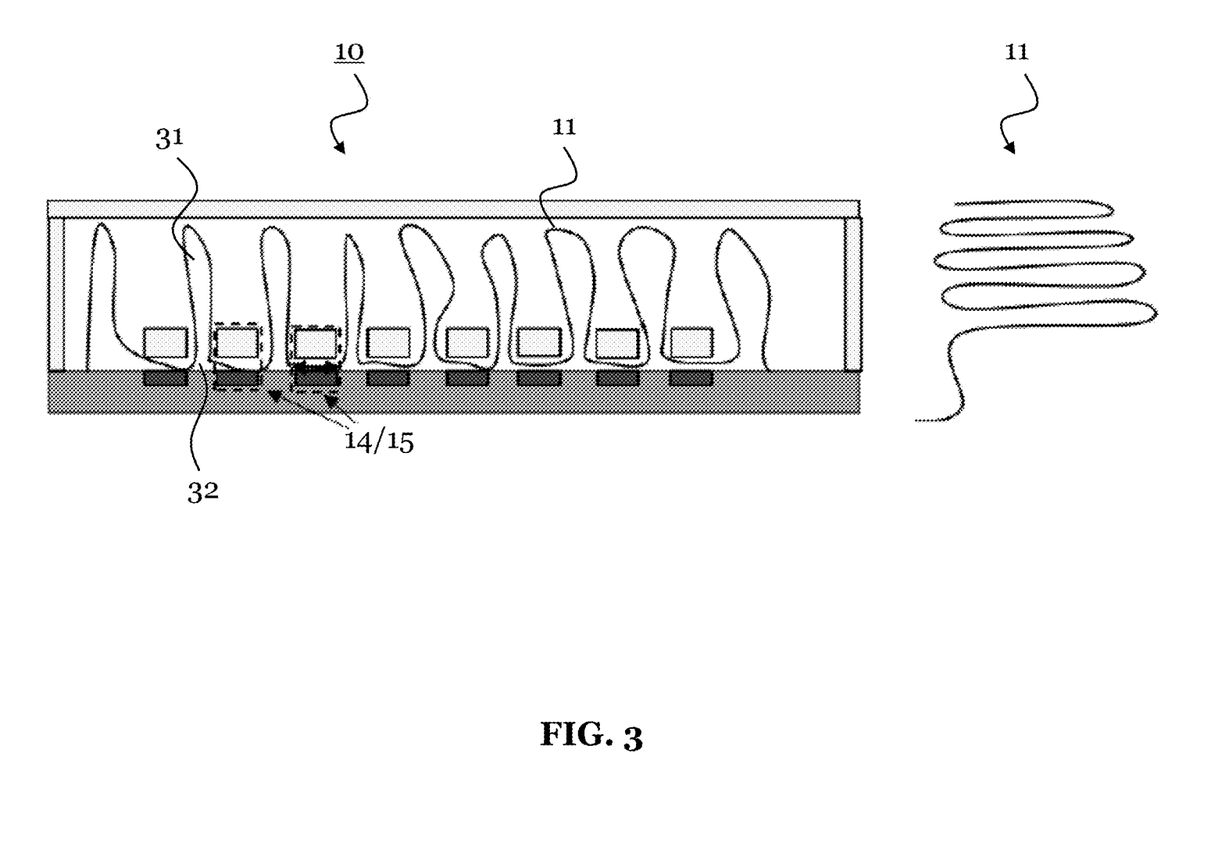
FIG. 3 shows a storage device according to an embodiment of the disclosed technology, with a plurality of cavities to store the tape, the cavities being arranged along the transport direction of the tape.

FIG. 3 shows a storage device 10 according to an embodiment of the disclosed technology, which builds on the embodiment of FIG. 1. The storage device 10 of FIG. 3 has further, optional features. Same elements in FIG. 1 and FIG. 3 are labelled with the same reference signs and function likewise.

In particular, the storage device 10 of FIG. 3 includes a plurality of cavities 31. Each cavity 31 is configured to receive a part of the tape 11, and the cavities 31 are arranged one after the other along the length of the storage device 10 and/or the length of the tape 11. In particular, the storage device 10 also includes a plurality of actuators 14, and each cavity 31 may be aligned with a gap 32 between two adjacently arranged actuators 14. The storage device 10 may further be configured to fold the tape 11 into each cavity 31. Each actuator 14 may move only a segment of the tape 11, for example, the tape 11 folded into the cavities 31 arranged before and after that actuator 14 in the length direction.

The folding of the tape 11 into the cavities 31 can optionally be assisted by other means, for example, by electrostatic force applied in the cavity 31 to move the bulk material 22 of the tape 11 up (into the cavity 31) or down (out of the cavity). Further, magnetic or electrostatic patterns could be applied to the tape 11 to ensure a proper folding of the tape 11 in/into the cavity or cavities 31.

Figure 4:
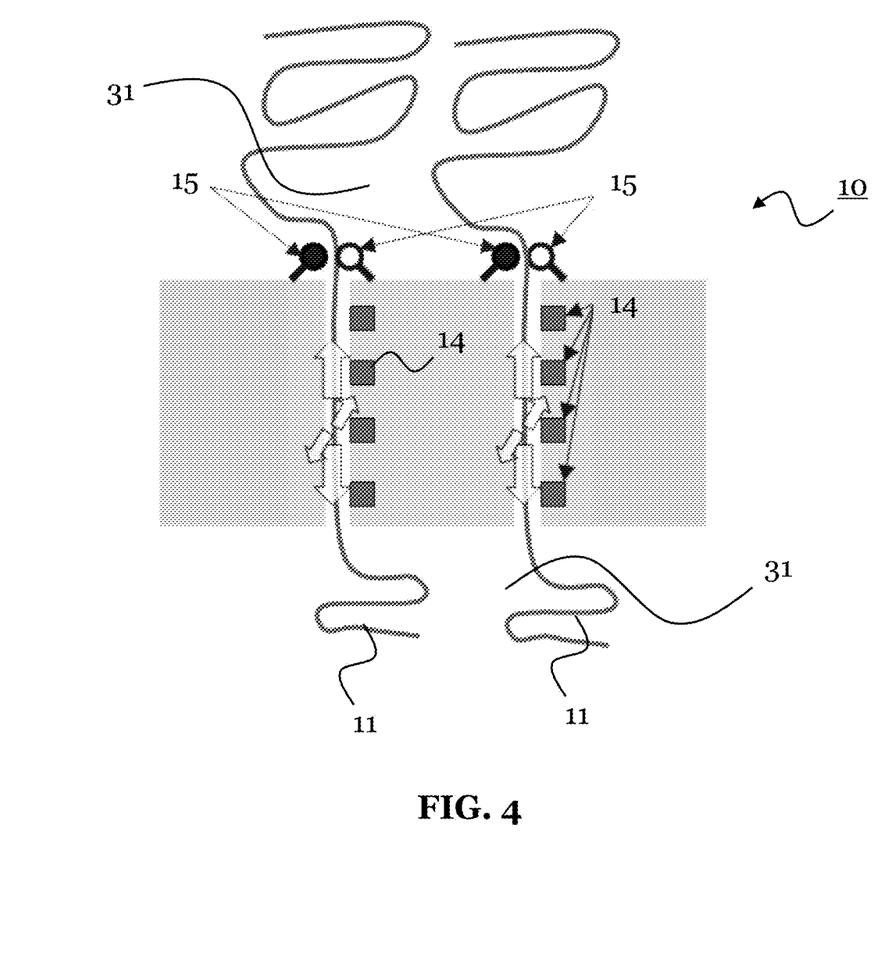
FIG. 4 shows a storage device according to an embodiment of the disclosed technology, with a plurality of cavities to store the tape, the cavities being arranged before and after the actuators in transport direction of the tape.

FIG. 4 shows a storage device 10 according to an embodiment of the disclosed technology, which builds on the embodiment of FIG. 1. The storage device 10 of FIG. 4 has further, optional features. Same elements in FIG. 1 and FIG. 4 are labelled with the same reference signs and function likewise.

In particular, FIG. 4 shows an alternative configuration of the embodiment shown in FIG. 3. Instead of the tape 11 being stored in multiple cavities 31 arranged above the active part (actuators 14, read/write data heads 15, tape 11) of the storage device 10, the tape 11 is stored in one or more cavities 31 arranged before and after the active part of the device 10, respectively.

The embodiments shown in FIG. 3 and FIG. 4 are also combinable. Generally, a storage device 10 may include one or more cavities 31, each for receiving a part of the tape 11.

Figure 5:
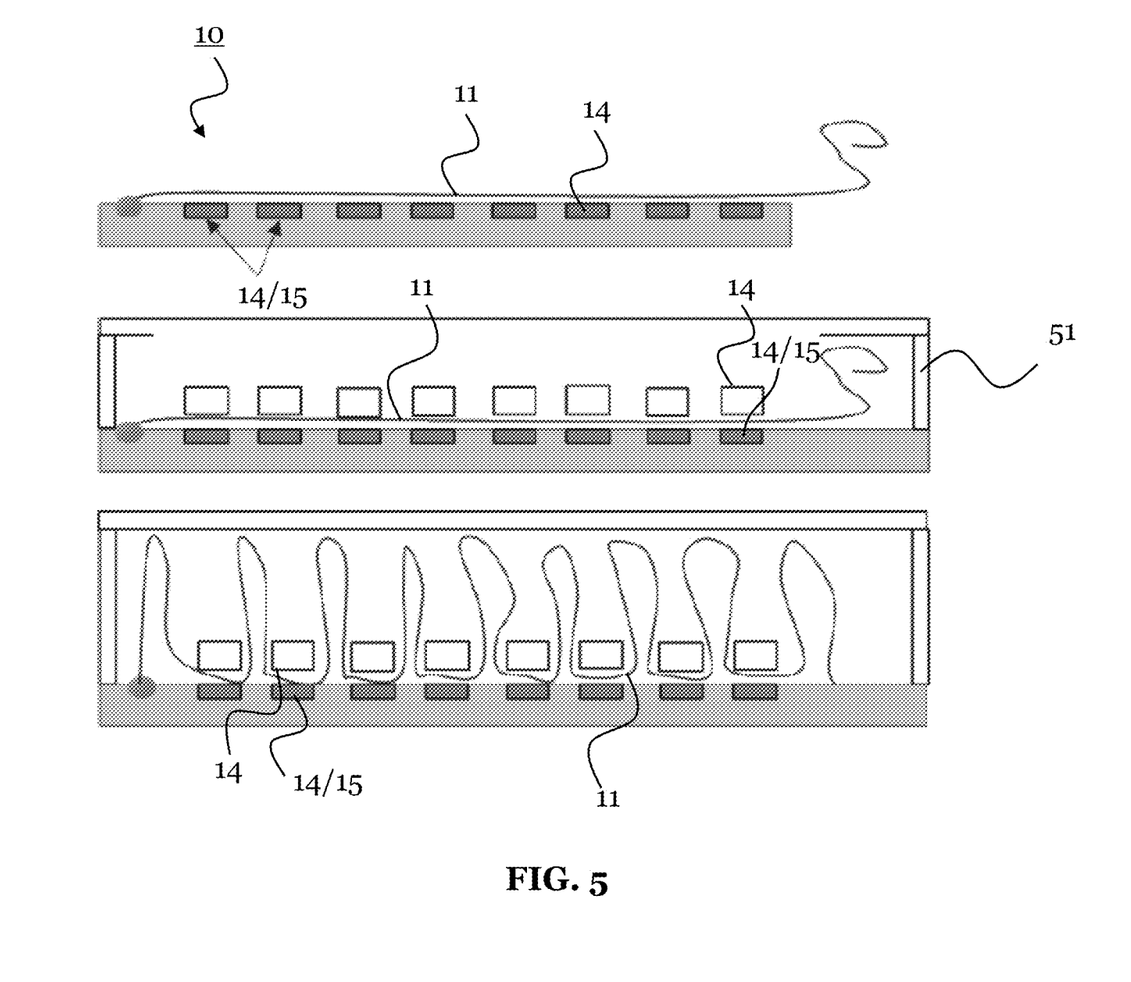
FIG. 5 shows an example of assembling a storage device according to an embodiment of the disclosed technology.

FIG. 5 shows a way of assembling a storage device 10 according to an embodiment of the disclosed technology. In particular, the storage device 10 shown in FIG. 3 is assembled in FIG. 5 as an example. The read and/or write data heads 15 and the actuators 14 may be created by using monolithic integration, thus forming a base chip of the storage device 10. Further, a long sheet/tape 11 may then be attached to this base chip. An enclosure 51 may be added on top of the base chip and tape 11. This enclosure 51 may provide one or more electrodes 24 for each actuator 14, and may further lock the sheet/tape 11 in place (the sheet/tape 11 can still move along its length, of course).

After the above assembly, one or more actuators 14 can be operated in such a way that the tape 11 gets distributed in the desired way between the actuators 14. Optionally, some of the actuators 14 can serve shorter tape segments than others, thereby providing faster access to the corresponding data on these tape segments.

In summary, an improved storage device 10 employing a tape 11 as storage medium is provided. The storage device 10 uses a special actuator mechanism to move the tape 11 in the storage device 10, in order to write and/or read data to and/or from the tape 11 in a fast and reliable manner. Further, the storage device 10 can be built in a compact manner and with a low cost per bit.

While the disclosed technology has been illustrated and described in detail in the drawings and foregoing description, such illustration and description are to be considered illustrative or exemplary and not restrictive. Other variations to the disclosed embodiments can be understood and effected by those skilled in the art in practicing the claimed invention, from a study of the drawings, the disclosure and the appended claims.

What is claimed is:

1. A storage device comprising:
 a tape configured to store data,
 wherein the tape includes a plurality of first regions with a first dielectric constant and a plurality of second regions with a second dielectric constant that is higher than the first dielectric constant, the first regions and the second regions being alternatingly arranged along the length of the tape;
 one or more actuators configured to apply an electrical field across the width of the tape, in order to move the tape in length direction; and
 one or more data heads configured to read and/or write data from and/or to the tape.

2. The storage device of claim 1, wherein:
 each of the first regions has a first dielectric constant in a range of 1-10, and/or
 each of the second regions has a second dielectric constant in a range of 50-100.

3. The storage device of claim 1, wherein each of the second regions has a length in a range of 0.1-10 µm.

4. The storage device of claim 1, wherein the second regions are periodically arranged along the length of the tape with a pitch in a range of 0.2-20 µm.

5. The storage device of claim 1, wherein:
 the tape comprises a bulk material with a first dielectric constant, the bulk material forming the first regions, and
 the bulk material includes a plurality of material elements with a second dielectric constant that is higher than the first dielectric constant, the material elements being arranged one after another along the length of the tape and forming the second regions.

6. The storage device of claim 5, wherein:
 the bulk material comprises polyethylene naphthalate (PEN), and/or
 each of the material elements comprises $TiO_2$, $BaTiO_3$, BZT, or $ZrO$.

7. The storage device of claim 5, wherein:
 each of the material elements has a width in a range of 60%-80% of the width of the tape, and/or
 the material elements occupy together between 20%-45% of a total volume of the tape.

8. The storage device of claim 1, wherein one or more surface regions of the tape are configured to store the data.

9. The storage device of claim 1, wherein:
 each of the one or more actuators comprises at least three electrodes, the tape being sandwiched between a first electrode arranged on one side of the tape, and a second electrode and a third electrode arranged on another side of the tape.

10. The storage device of claim 9, wherein:
 each of the one or more actuators is configured to apply a fixed voltage to the first electrode and an alternating voltage across the second electrode and the third electrode, in order to move the tape in a length direction.

11. The storage device of claim 9, wherein:
 a distance between the first electrode and the second electrode and/or the third electrode is in a range of 110%-200% of the width of the tape.

12. The storage device of claim 1, further comprising:
 one or more cavities, each cavity configured to receive a part of the tape.

13. The storage device of claim 12, comprising:
 a plurality of actuators arranged along the length of the tape, and
 a plurality of cavities, each cavity being aligned with a gap between two adjacently arranged actuators.

14. The storage device of claim 12, wherein the one or more cavities is arranged, in the length direction, before or after the one or more actuators.

15. The storage device of claim 12, wherein the storage device is configured to fold the tape in the one or more cavities.

16. The storage device of claim 1, wherein the storage device is configured to:
   determine a position of the tape relative to the one or more data heads and the one or more actuators based on one or more read signals obtained from the one or more data heads and/or based on capacitive sensing of one or more of the second regions, and
   determine, based on the position of the tape, a voltage pattern to apply to the one or more actuators.

17. A method of storing data in a storage device comprising a tape configured to store data, one or more actuators configured to apply an electrical field across the width of the tape, and one or more data heads configured to read and/or write data from and/or to the tape, the tape including a plurality of first regions with a first dielectric constant and a plurality of second regions with a second dielectric constant that is higher than the first dielectric constant, the first regions and the second regions being alternatingly arranged along the length of the tape, the method comprising:
   moving the tape in the length direction by applying, using the one or more actuators, an electric field across the width the tape; and
   reading data from the tape or writing data to the tape, using the one or more data heads.

18. The method of claim 17, further comprising:
   determining a position of the tape relative to the one or more data heads and the one or more actuators based on one or more read signals obtained from the one or more data heads and/or based on capacitive sensing of one or more of the second regions; and
   determining, based on the position of the tape, a voltage pattern to apply to the one or more actuators.

19. The method of claim 17, wherein each of the second regions has a length in a range of 0.1-10 µm.

20. The method of claim 17, wherein each of the one or more actuators comprises at least three electrodes, the tape being sandwiched between a first electrode arranged on one side of the tape, and a second electrode and a third electrode arranged on another side of the tape, and wherein the method further comprises:
   applying a fixed voltage to the first electrode and an alternating voltage across the second electrode and the third electrode; and
   moving the tape in the length direction.

* * * * *